(12) United States Patent
Kim et al.

(10) Patent No.: US 9,416,012 B2
(45) Date of Patent: *Aug. 16, 2016

(54) METHOD OF FABRICATING SILICON CARBIDE POWDER

(75) Inventors: Byung Sook Kim, Seoul (KR); Jung Eun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 175 days.

This patent is subject to a terminal disclaimer.

(21) Appl. No.: 14/129,219

(22) PCT Filed: Jun. 25, 2012

(86) PCT No.: PCT/KR2012/004990
§ 371 (c)(1),
(2), (4) Date: Dec. 24, 2013

(87) PCT Pub. No.: WO2012/177097
PCT Pub. Date: Dec. 27, 2012

(65) Prior Publication Data
US 2014/0127512 A1    May 8, 2014

(30) Foreign Application Priority Data

Jun. 24, 2011 (KR) ........................ 10-2011-0061629

(51) Int. Cl.
| | | |
|---|---|---|
| *C01B 31/00* | (2006.01) | |
| *C01B 31/36* | (2006.01) | |
| *C04B 35/573* | (2006.01) | |
| *B82Y 30/00* | (2011.01) | |

(52) U.S. Cl.
CPC ............... *C01B 31/36* (2013.01); *B82Y 30/00* (2013.01); *C04B 35/573* (2013.01); *C04B 2235/3418* (2013.01); *C04B 2235/3834* (2013.01); *C04B 2235/424* (2013.01); *C04B 2235/428* (2013.01); *C04B 2235/48* (2013.01); *C04B 2235/52* (2013.01); *C04B 2235/528* (2013.01); *C04B 2235/5288* (2013.01); *C04B 2235/5436* (2013.01); *C04B 2235/6562* (2013.01); *C04B 2235/72* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 5,093,039 A | * | 3/1992 | Kijima et al. ................. | 252/516 |
| 5,720,933 A | * | 2/1998 | Srinivasan ..................... | 423/345 |
| 6,811,761 B2 | * | 11/2004 | Brese et al. ................... | 423/345 |

FOREIGN PATENT DOCUMENTS

| | | | |
|---|---|---|---|
| JP | 58-091027 | * | 5/1983 |
| JP | 3174622 B2 | | 6/2001 |
| KR | 10-2010-0071863 A | | 6/2010 |
| KR | 10-2011-0021530 A | | 3/2011 |
| WO | 2011/025285 | * | 3/2011 |

OTHER PUBLICATIONS

International Search Report in International Application No. PCT/KR2012/004990, filed Jun. 25, 2012.

* cited by examiner

*Primary Examiner* — Steven Bos
(74) *Attorney, Agent, or Firm* — Saliwanchik, Lloyd & Eisenschenk

(57) ABSTRACT

A method of fabricating silicon carbide powder according to the embodiment comprises the steps of preparing a mixture by mixing a silicon source comprising silicon, a silicon carbide source and a carbon source comprising at least one of a solid carbon and a organic compound; and reacting the mixture.

8 Claims, 1 Drawing Sheet

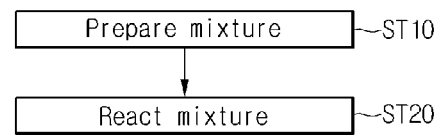

US 9,416,012 B2

METHOD OF FABRICATING SILICON CARBIDE POWDER

CROSS-REFERENCE TO RELATED APPLICATIONS

This application is the U.S. national stage application of International Patent Application No. PCT/KR2012/004990, filed Jun. 25, 2012, which claims priority to Korean Application No. 10-2011-0061629, filed Jun. 24, 2011, the disclosures of each of which are incorporated herein by reference in their entirety.

TECHNICAL FIELD

The embodiment relates to a method of fabricating silicon carbide powder.

BACKGROUND ART

Recently, silicon carbide has been used in various electronic devices as a semi-conductor material for various purposes. In particular, the silicon carbide is very useful because the silicon carbide has the superior physical strength and high resistance against the chemical attack. In addition, the silicon carbide represents the superior electronic characteristics, such as the high radiation hardness, high breakdown filed, relatively wide bandgap, high saturated electron drift velocity, high operating temperature, and high absorption and emission of quantum energy in the blue, violet and ultraviolet bands of a spectrum.

DISCLOSURE OF INVENTION

Technical Problem

The embodiment provides a method of fabricating silicon carbide powder, capable of synthesizing high-purity silicon carbide powder having the grain size of 10 μm or above at the low temperature.

Solution to Problem

A method of fabricating silicon carbide powder according to the embodiment comprises the steps of preparing a mixture by mixing a silicon source comprising silicon, a silicon carbide source and a carbone source comprising at least one of a solid carbon and a organic compound; and reacting the mixture.

The silicon carbide powder according to the embodiment may be fabricated through the steps of preparing a mixture by mixing a silicon source comprising silicon and a solid carbon source or a carbon source comprising an organic carbon compound with a silicon carbide source, and reacting the mixture. The silicon source comprises one selected from the group consisting of silica sol, silicon dioxide, fine silica and quartz powder. The solid carbon source comprises one selected from the group consisting of carbon black, a carbon nano tube or fullerene. The organic carbon compound comprises one selected from the group consisting of phenol resin, franc resin, xylene resin, polyimide, polyurethane, polyacrylonitrile, polyvinyl alcohol, cellulose, pitch, tar or sugar.

Advantageous Effects of Invention

According to the method of fabricating the silicon carbide powder of the embodiment, the silicon carbide is prepared by reacting the mixture comprising the silicon source, the carbon source and the silicon carbide source, and the silicon carbide prepared through the reaction is combined with the silicon carbide source serving as a core so that the silicon carbide is grown as grains, thereby fabricating the silicon carbide powder having the grain size of about 10 μm or above.

Therefore, the silicon carbide powder can be used as a source material for a silicon carbide sintered body having the grain size of about 10 μm or above in the reactive sintering process or for the growth of a silicon carbide single crystal.

In addition, since the silicon carbide source serves as a core of the silicon carbide powder, the silicon carbide powder having high purity of about 5N 99.999% or above can be fabricated.

Thus, the embodiment can fabricate the silicon carbide powder having high purity.

That is, the embodiment can provide the method of fabricating the silicon carbide powder, which has the high purity and can readily increase the grain size.

BRIEF DESCRIPTION OF DRAWINGS

FIG. 1 is a flowchart showing a method of fabricating silicon carbide powder according to the embodiment.

MODE FOR THE INVENTION

Hereinafter, a method of fabricating silicon carbide powder according to the embodiment will be described in detail with reference to accompanying drawings.

FIG. 1 is a flowchart showing a method of fabricating the silicon carbide powder according to the embodiment.

Referring to FIG. 1, the method of fabricating the silicon carbide powder according to the embodiment comprises the steps of preparing a mixture by mixing a silicon source comprising silicon, a silicon carbide source and a carbone source comprising at least one of a solid carbon and a organic compound (ST10); and reacting the mixture (ST20).

Hereinafter, each step of the method will be described in more detail.

In step ST10 of preparing the mixture, the silicon source, the carbon source and the silicon carbide source are prepared and mixed to form a mixture material.

The silicon source may comprise various materials capable of providing silicon. For instance, the silicon source may comprise silica sol, silicon dioxide, fine silica and quartz powder, but the embodiment is not limited thereto. For instance, an organic silicon compound comprising silicon may be used as the silicon source.

The carbon source may comprise a solid carbon source or an organic carbon compound.

The solid carbon may comprise a carbon black, a carbon nano tube (CNT) or fullerene ($C_{60}$).

The organic carbon compound may comprise phenol resin, franc resin, xylene resin, polyimide, polyurethane, polyacrylonitrile, polyvinyl alcohol, cellulose, sugar, pitch, or tar.

The carbon source, the silicon source and the silicon carbide source may be mixed with each other through the wet mixing process using the solvent or the dry mixing process without using the solvent. According to the wet mixing process, the carbon source can be conglomerated with the silicon source, so that the productivity can be improved. In addition, according to the dry mixing process, the cost for the solvent can be saved, the pollution caused by the solvent can be prevented, and the carbonization process can be omitted, so that the process can be simplified.

The silicon source, the carbon source and the silicon carbide source are mixed by using a ball mill or an attrition mill to recover mixture powder. The mixture powder can be recovered by filtering the mixture through a sieve.

The silicon source and the carbon source can be mixed in a predetermined mass ratio. For instance, a mole ratio of carbon comprised in the carbon source to silicon comprised in the silicon source (hereinafter, referred to as mole ratio of carbon to silicon) is in the range of about about 1:1.5 to about 1:3. If the mole ratio of carbon to silicon exceeds 3, the amount of carbon is so excessive that the amount of residual carbon, which does not participate in the reaction, is increased, lowering the recovery rate. In addition, if the mole ratio of carbon to silicon is less than about 1.5, the amount of silicon is so excessive that the amount of residual silicon, which does not participate in the reaction, is increased, lowering the recovery rate. That is, the mole ratio of carbon to silicon must be determined by taking the recovery rate into consideration.

Since the silicon source is volatilized into a gas phase at the high temperature in reaction step ST20, the mole ratio of carbon to silicon is set in the range of about 1.8 to about 2.7.

The silicon carbide source can be mixed with the silicon source and the carbon source in a predetermined mass ratio. For instance, a weight ratio of the silicon carbide source to the sum of the weight of the silicon source and the carbon source is in the range of about about 1:0.3 to about 1:0, preferably, about 1:1 to about 1:3. In addition, the silicon carbide source may comprise fine powder having the β type, which is the low-temperature stable phase, but the embodiment is not limited thereto. For instance, the silicon carbide source may has the a type, which is high-temperature stable phase.

In addition, the silicon carbide source may have an average grain size of about 1 μm to about 10 μm. The silicon carbide source having the average grain size of about 1 μm to about 10 μm is combined with the silicon carbide, which is formed through the reaction of the silicon source and the carbon source, so that the silicon carbide is grown as grains. This grain growth will be described later in detail.

The silicon source, the carbon source and the silicon carbide source are uniformly mixed with each other to form the mixture.

In step ST20 of reacting the mixture, the mixture is subject to the reaction to form the silicon carbide. In detail, mixture powder is weighed in a graphite crucible and then the mixture powder is supplied and heated in a high-temperature reaction furnace, such as a graphite furnace. The process to form the silicon carbide may be classified into the carbonization process and the synthesis process.

In the carbonization process, the organic carbon compound is carbonized so that carbon is produced. The carbonization process is performed at the temperature in the range of about 600° C. to about 1200° C. In detail, the carbonization process is performed at the temperature in the range of about 800° C. to about 1100° C. If the solid carbon source is used as the carbon source, the carbonization process may be omitted.

After that, the synthesis process is performed. In the synthesis process, the silicon source is reacted with the solid carbon source or the organic carbon compound, so that the silicon carbide is formed through following reaction formulas 1 to 3.

$SiO_2(s)+C(s)\rightarrow SiO(g)+CO(g)$ [Reaction formula 1]

$SiO(g)+2C(s)\rightarrow SiC(s)+CO(g)$ [Reaction formula 2]

$SiO_2(s)+3C(s)\rightarrow SiC(s)+2CO(g)$ [Reaction formula 3]

In order to facilitate the above reaction, the heating temperature is set to 1300° C. or above. If the heating temperature is set in the range of 1300° C. to 1900° C., the fabricated silicon carbide may have the β type, which is the low-temperature stable phase. The silicon carbide having the β type consists of fine particles, so the strength of the silicon carbide can be improved. However, the embodiment is not limited thereto. For instance, if the heating temperature exceeds 1800° C., the silicon carbide may have the a type, which is the high-temperature stable phase. The synthesis process may be performed for about 1 hour to about 7 hours.

Step ST20 may be performed in the inert gas atmosphere or the vacuum atmosphere in order to prevent the undesired side reaction during the synthesis process for the silicon carbide. However, the embodiment is not limited thereto. That is, the reaction can be performed in various atmospheres.

The silicon carbide formed through the reaction may have a grain size of about 10 μm or above. Preferably, the silicon carbide formed through the reaction may have a grain size of about 5 μm to about 100 μm. More preferably, the silicon carbide formed through the reaction may have a grain size of about 10 μm to about 50 μm.

The silicon carbide source is combined with the silicon carbide, which is formed through the reaction of the silicon source and the carbon source, thereby producing the silicon carbide powder having the grain size of about 10 μm or above.

That is, the silicon carbide source serves as a core of the silicon carbide after the reaction and the silicon carbide formed through the reaction is combined with the core so that the silicon carbide is grown as grains, thereby forming the silicon carbide having the grain size of about 10 μm or above. At this time, the average grain size of the silicon carbide source serving as the core may have the average grain size of about 1 μm to about 10 μm.

In general, the silicon carbide powder, which is formed through the reaction of the silicon source and the carbon source, has the grain size of about 0.5 μm to about 5 μm. However, since the silicon carbide powder according to the embodiment is formed through the reaction by adding the silicon carbide source, the silicon carbide serves as the core of the grain growth, so that the silicon carbide powder fabricated through the final reaction may have the grain size of about 10 μm or above.

In addition, since the silicon carbide source having the average grain size of about 1 μm to about 10 μm is used as the core in the grain growth, the high-purity silicon carbide powder can be fabricated. For instance, the silicon carbide powder having the high purity of about 5N 99.999% or above can be fabricated. Preferably, the silicon carbide powder having the high purity of about 99.999% to about 99.99999999 can be fabricated.

Further, the silicon carbide powder according to the embodiment may have a spherical shape, a hexahedral shape or a dodecahedral shape. Thus, the silicon carbide powder may have a desired shape as compared with the silicon carbide powder fabricated through the CVD process.

Hereinafter, the method of fabricating the silicon carbide powder according to the manufacture examples and comparative example will be described in more detail. The following manufacture examples are illustrative purpose only and the disclosure is not limited to the manufacture examples.

MANUFACTURE EXAMPLE 1

About 50 g of fumed silica, about 63 g of phenol resin and about 120 g of silicon carbide were mixed to prepare mixture 1. At this time, the average grain size of the fumed silica was about 30 nm and the residual rate of carbon in the phenol resin after the carbonization process was about 60%. In addition, the silicon carbide had the β type with the average grain size of about 1 μm.

After that, the mixture 1 was subject to the carbonization process at the temperature of about 850° C. for five hours while rising the temperature at the rate of 3° C./min and then subject to the synthesis process at the temperature of about 1700° C. for three hours while rising the temperature at the rate of 5° C./min, thereby forming silicon carbide powder 1.

MANUFACTURE EXAMPLE 2

Mixture 2 was prepared by mixing fumed silica and phenol resin under the same composition and same condition of manufacture example 1 except that about 50 g of silicon carbide in mass was added.

Then, the carbonization process and the synthesis process were carried out under the same condition of manufacture example 1, thereby forming silicon carbide powder 2.

MANUFACTURE EXAMPLE 3

Mixture 3 was prepared by mixing fumed silica and phenol resin under the same composition and same condition of manufacture example 1 except that about 20 g of silicon carbide in mass was added.

Then, the carbonization process and the synthesis process were carried out under the same condition of manufacture example 1, thereby forming silicon carbide powder 3.

COMPARATIVE EXAMPLE 1

Silicon carbide powder 4 was formed in the same manner as that of manufacture example 1 except that the silicon carbide was not employed.

The average grain size of the silicon carbide powder fabricated according to manufacture examples 1 to 3 and comparative example 1 is shown in Table 1.

TABLE 1

| Smaple | Average grain size (μm) |
|---|---|
| Silicon carbide powder 1 | 10.2 |
| Silicon carbide powder 2 | 13.5 |
| Silicon carbide powder 3 | 10.7 |
| Silicon carbide powder 4 | 2.1 |

Referring to Table 1, the average grain size of the silicon carbide powder according to manufacture examples 1 to 3 is larger than that of the silicon carbide powder according to comparative example 1. That is, if the reaction is performed by adding the silicon carbide source to the silicon source and the carbon source, the grain size of the final silicon carbide can be increased.

That is, since the silicon carbide source having the average grain size of about 1 μm or above is added and mixed, the silicon carbide source serves as the core combined with the silicon carbide in the reaction, so the silicon carbide can be grown as grains, so that the silicon carbide powder having the average grain size of about 1 μm or above can be fabricated.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of fabricating silicon carbide powder, the method comprising:
   preparing a mixture by mixing a silicon source comprising silicon, a silicon carbide source and a carbon source comprising at least one of a solid carbon and an organic compound; and
   reacting the mixture,
   wherein a weight ratio of the silicon carbide source to a sum of the silicon source and the carbon source is in a range of about 1:1 to about 1:3.

2. The method of claim 1, wherein the silicon carbide source has an average grain size of about 1 μm to about 10 μm.

3. The method of claim 1, wherein the silicon carbide source comprises a β crystal phase.

4. The method of claim 1, wherein the silicon source comprises at least one selected from the group consisting of silica sol, silicon dioxide, fine silica and quartz powder.

5. The method of claim 1, wherein the solid carbon comprises at least one selected from the group consisting of carbon black, a carbon nano tube and fullerene.

6. The method of claim 1, wherein the organic compound comprises at least one selected from the group consisting of phenol resin, franc resin, xylene resin, polyimide, polyurethane, polyacrylonitrile, polyvinyl alcohol, cellulose, pitch, tar and sugar.

7. The method of claim 1, wherein the silicon source is mixed with the carbon source in a mole ratio of about 1:1.5 to about 1:3.

8. The method of claim 1, wherein the silicon source is mixed with the carbon source in a mole ratio of about 1:1.8 to about 1:2.7.

* * * * *